Jan. 17, 1939.　　G. G. POWERS ET AL　　2,144,387
SPRING MAKING MACHINE
Original Filed May 20, 1936　　5 Sheets-Sheet 1
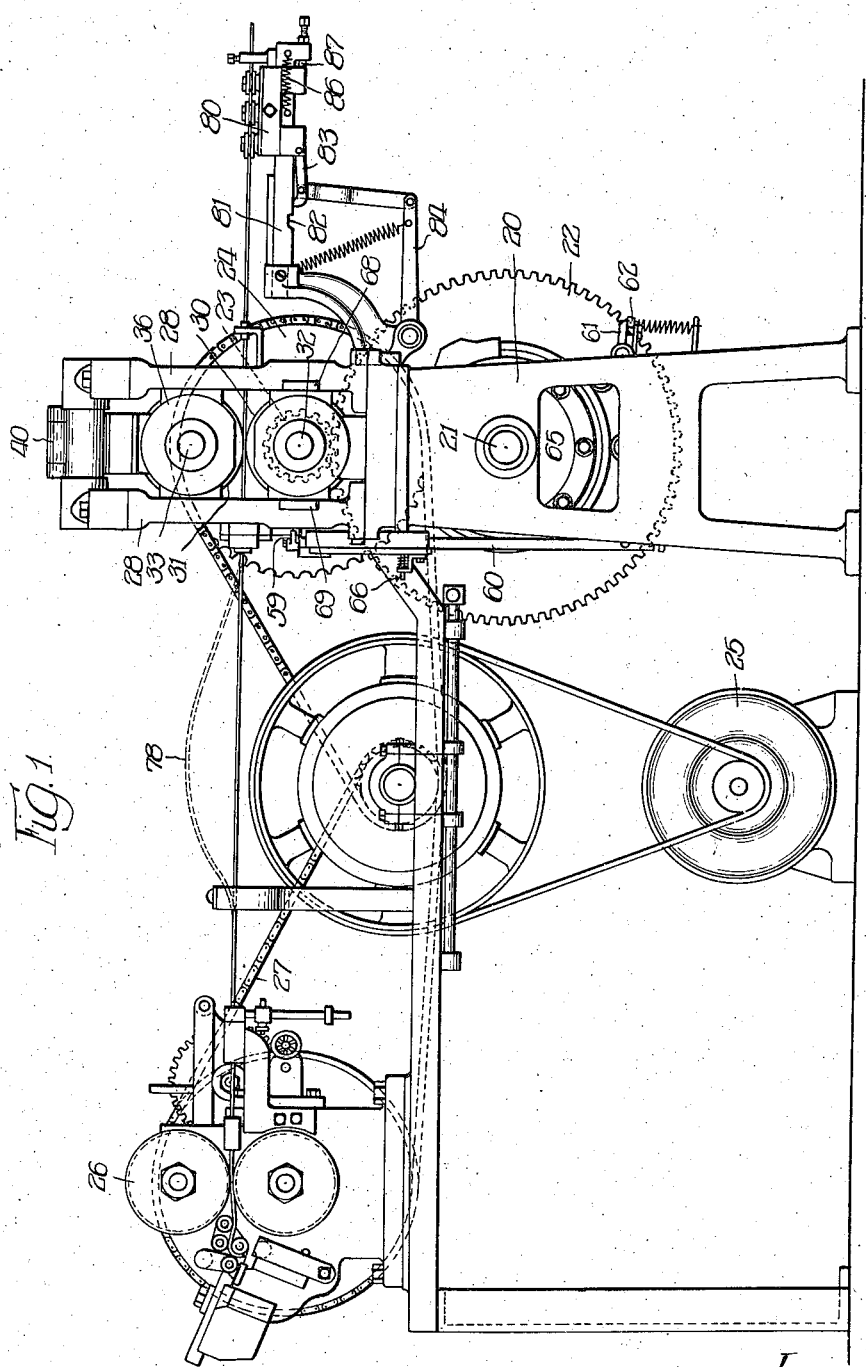
Inventors:
George G. Powers,
Clarence H. Frederick,

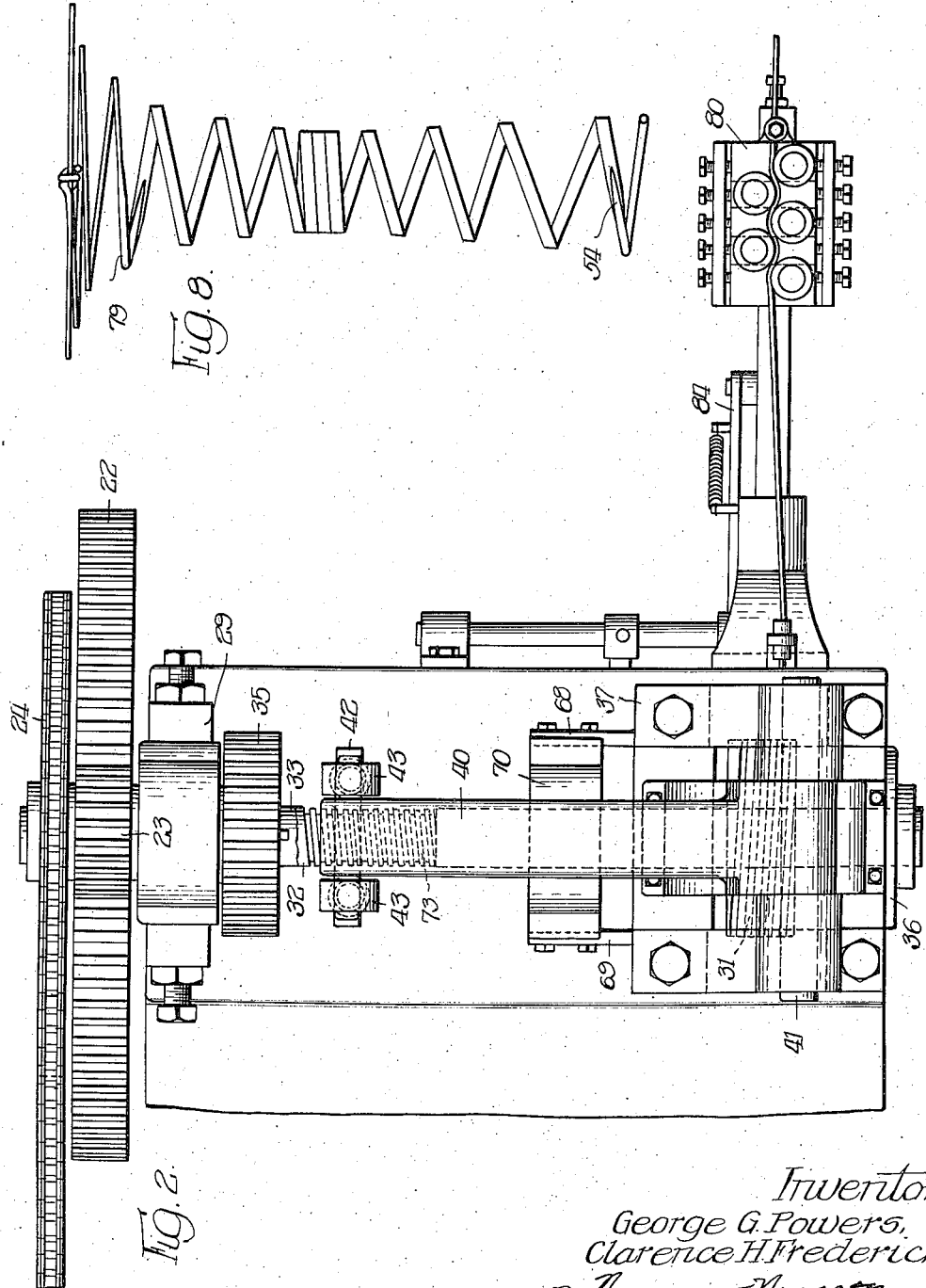

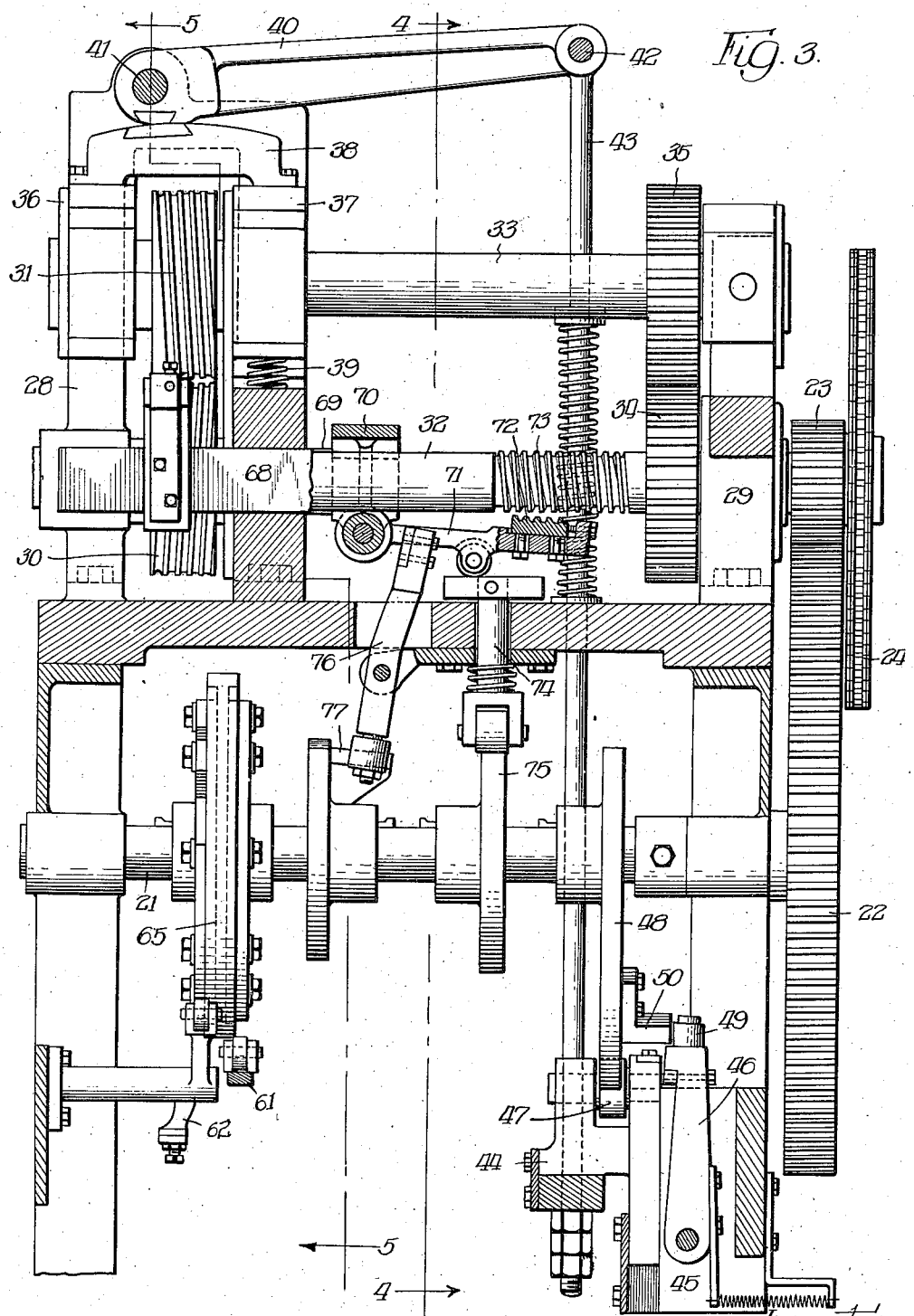

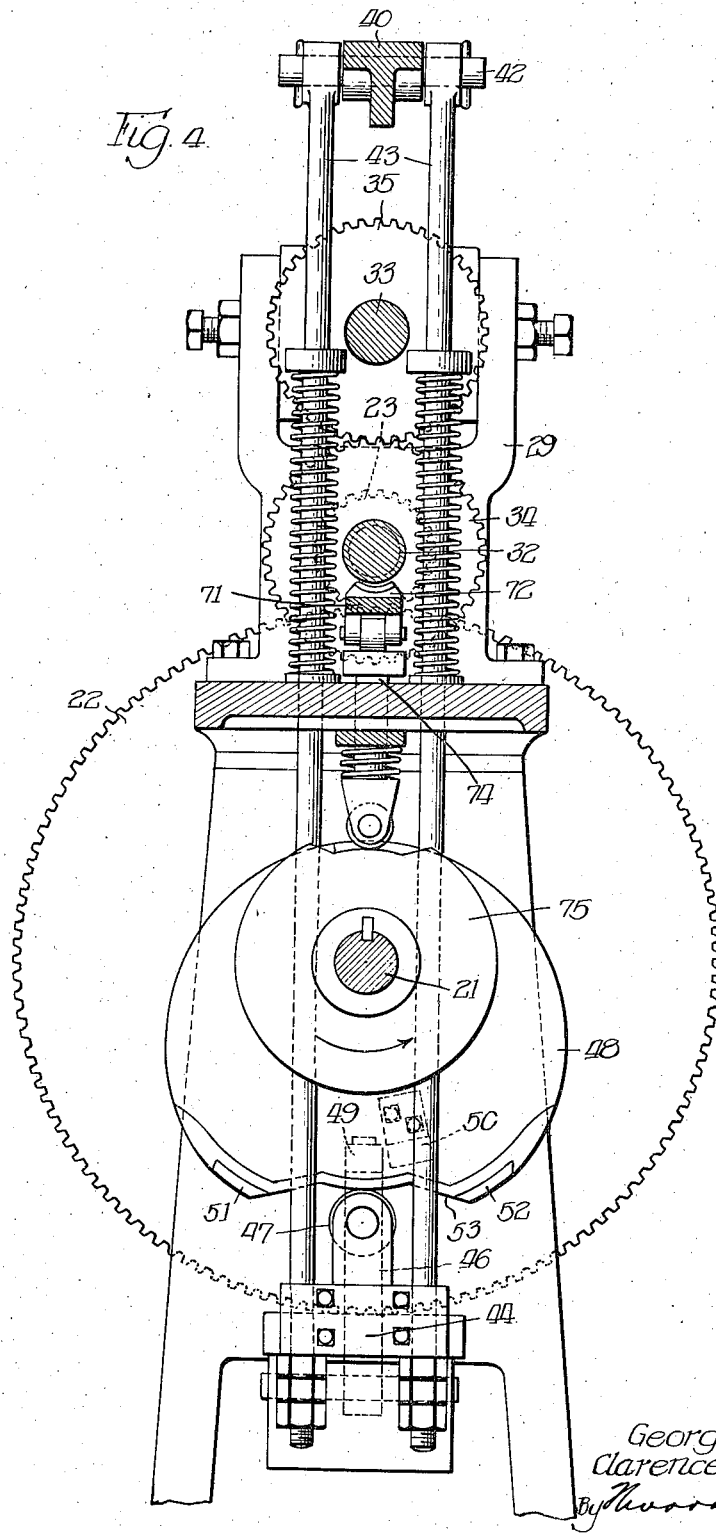

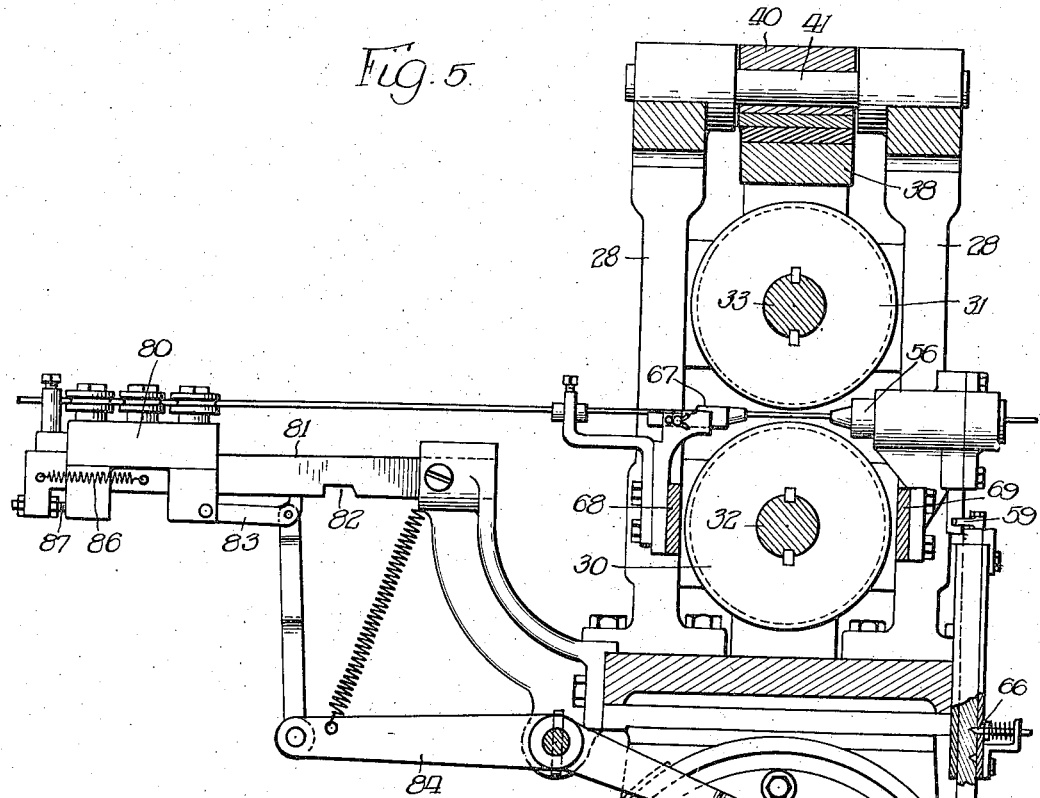

Patented Jan. 17, 1939

2,144,387

UNITED STATES PATENT OFFICE 2,144,387

SPRING MAKING MACHINE

George G. Powers and Clarence H. Frederick, Chicago, Ill., assignors, by direct and mesne assignments, to The Powers Spring Corporation, Chicago, Ill., a corporation of Illinois Application May 20, 1936, Serial No. 80,702
Renewed June 18, 1938

11 Claims. (Cl. 140—79)

Our invention relates to machines for producing springs and particularly springs such as illustrated in the patent of George G. Powers, No. 1,963,052 of June 12, 1934. This machine is an improvement on the machine illustrated in the patent to Powers and Rhinevault, No. 1,968,802 of July 31, 1934.

The design of a machine for the commercial production of a spring such as illustrated in the patent to Powers aforesaid has been difficult, particularly because of the necessity for production at high speed, the requirement for accuracy in the location of the respective lengths of round and flat wire, etc. In the finished spring in question, one of which is illustrated in Fig. 8 of the drawings hereof, it will be seen that the two extremities of the wire composing the spring must remain round, the upper extremity to permit knotting or tying and the lower extremity for engagement with the spring frame. It is likewise necessary that short intermediate portions separating the flat portions in different planes shall likewise remain round and that the change from the flat to the round shall be gradual. Not only should the round merge into the flat, but the wire at the junction should be reinforced or stiffened. An ideal design contemplates the formation of a rib extending over the intersection of the round and flat and provided on both sides of the wire. Such a design cannot be produced by passing the wire between flat rolls, and to that end the machine here illustrated was designed, in which the rolls are helically grooved to provide a long pass of substantially the length of the wire composing the contemplated spring, the grooves being shaped at successive points in their length to produce a finished wire of the desired cross-section.

In order to produce a spring in which the flattened portion of the wire occupies different planes, the length of wire is released at an intermediate point and rotated through 90 degrees so that the continuing portion may be flattened in another plane. This was disclosed in the patent to Powers and Rhinevault heretofore identified, but in said earlier construction it was necessary to separate the rolls to permit the rotation to take place; it is accomplished in this instance by enlarging the diameter of the pass.

The invention will be more readily understood by reference to the accompanying drawings, in which:

Fig. 1 is a side elevation of a machine, including a coiler, for producing the spring of my invention;

Fig. 2 is a plan view of the machine without the coiler;

Fig. 3 is a front view, partly in section;

Figs. 4 and 5 are sectional views on the lines 4—4, 5—5 of Fig. 3;

Fig. 6 is a sectional view through the twister;

Fig. 7 is a sectional view on the line 7—7 of Fig. 6, the view being rotated 90 degrees;

Fig. 8 is a view of the spring intended to be formed; and,

Figs. 9 to 16 inclusive are fragmentary crosssectional views of different successive portions of the helical pass in the rolls.

The machine of my invention consists, generally, of two elements, the flattener and the coiler. The coiler may be substantially a duplicate of that illustrated in the patent to Powers and Rhinevault and will not be specifically described herein.

The flattener of my invention comprises a frame 20, on which is mounted in suitable bearings a cam shaft 21. A large gear 22 driven through a pinion 23 and sprocket wheel 24 serves to connect the machine through suitable belting to a motor 25. The motor also drives the coiler, the feed rolls of which are indicated at 26, through a sprocket chain 27.

Disposed on the frame 20 is a roll housing 28, and a housing 29 for the extended ends of the roll shafts. The rolls 30—31 are held on shafts 32—33, which are geared together by the spur gears 34—35. The shaft 32 carries the pinion 23, the overhung ends of the shafts being carried in bearings in the housing 29.

The lower roll 30 and the shaft 32 are rigidly held in bearings in the housing 28 while the upper roll and its shaft 33 are carried in journal boxes 36—37, vertically slidable, in the housing 28, the two boxes being joined by a saddle 38. A spring 39 tends to separate the rolls.

An arm 40 carried on a transverse pivot 41 bears against the saddle 38 at a point very near to the pivot and is so arranged that downward movement of the arm 40 tends to force the two rolls into surface engagement. To the outer end of the arm or lever 40 is connected, by means of a transverse pin 42, a pair of pull rods 43 having a crosshead 44 at their lower ends. The cross-head is guided in suitable ways in a fixed member 45 which member carries a dog or latch 46. A roller 47 is carried by the cross-head and a cam 48 carried by the shaft 21 cooperates with the roller to effect the lowering of the cross-head and consequently of the upper roll 31. When the crosshead is depressed the dog 46 engages over the upper edge thereof and holds the roll firmly in lowered position until a roller 49 on the upper end of the dog 46 is engaged by an arm 50 on the cam 48, thus releasing the cross-head and permitting it and the upper roll 31 to rise. The contour of the cam 48 is shown in Fig. 4, the high point 51 of which serves to depress the cross-head while the high point 52 goes into engagement with the roller 47 just before the dog is released. Thereafter the roll 47 riding down the incline 53 permits the flattening roll to rise without shock.

The helical grooves shown in the rolls 30—31 are of varying cross-sectional outline. The pass formed by the registering grooves is of a length substantially equal to the length of a unit of wire necessary to form a spring such as shown in Fig. 8. Of course, the same result might be secured by providing two rolls of large diameter having a registering groove in the two rolls, the length of the grooves being equal to the length of wire to be treated, but for economy in the cost of the machine, it has been found desirable to utilize a helical groove formed on the face of much smaller rolls.

The contour or outline of the pass at different points in the length of the helical groove is illustrated in Figs. 9 to 16. At the start of a cycle, the rolls are separated and the grooves are somewhat larger than the diameter of the wire. As rotation continues, the rolls are brought together and the groove is reduced in size to that of the wire being treated, thus gripping the wire and starting the feed thereof, this being shown in Fig. 10. As rotation continues the transition from the round to the flat is begun, the pass being partly flat and partly round with the result that ribs 54—55 are formed on the sides of the wire. These are shown in Fig. 8, their purpose being to strengthen the wire at the junction between the round and flat. As the operation continues, the pass becomes flat in outline, as shown in Fig. 12, and this constitutes a substantial portion of the entire spring, the outlines shown in Figs. 9, 10 and 11 representing those used for forming the lower end of the spring shown in Fig. 8. All the portion of the spring from that point up to a point near the upper end is flat and is formed in the pass shown in Fig. 12. At that point near the upper end, the pass is shaped to effect the transition from the flat to the round as shown in Fig. 13. After progressing through the stage shown in Fig. 13 and emerging into the round wire, the pass is shaped as shown in Fig. 14, in which the wire is entirely free from the rolls. At that point the apparatus, later to be described, for rotating the wire through 90 degrees is operated and at the same time the apparatus for retracting the wire and taking up slack therein between the flattener and the coiler is operated. Thereafter the same progression of different outlines of the pass is continued, Fig. 15 showing the transition period which is followed by a flattening period and then by a fourth tapering period and a round gripping period, as shown in Fig. 16, which is the last portion of the long helical pass formed in the rolls. At this point the rolls are separated as shown in Fig. 9 and the wire returned to the position of Fig. 9 by the apparatus that will be later described. In Figs. 14, 15, 16 we have shown the cross-section lines of the wire at right angles to those shown in Figs. 9 to 13 to indicate that the wire has been shifted on its longitudinal axis.

The apparatus for rotating the wire in order that it might be produced with flattened portions arranged at right angles to each other is best shown in Figs. 5, 6 and 7 and comprises a cylindrical guide member 56 carried on a suitable bracket fixed to a slide bar 69, the cylindrical member having gear teeth 57 at one end engaged by a rack 58. The lower portion of the rack is notched to engage with an arm 59 carried by a push rod 60 that is positively moved in two directions by means of the arms 61, 62 actuated by cams 63—64 on a cam wheel 65 carried by the main shaft 21. A stop pin 66 pressed by a spring engages in notches in the push rod 60 to resiliently hold the parts in a desired position. The cam pieces 63—64 are adjustably held in order to adapt the machine for the production of a spring having different locations of the flats.

The guiding and directing means for the wire comprises a guide piece 67 carried on a bracket that is secured to a slide bar 68. This bar is duplicated at the opposite side as at 69, the twisting cylinder 56 being secured thereto. The two bars are fixed to a yoke 70 having an arm 71 pinned thereto, the arm carrying a short rack 72 adapted to engage a worm 73 formed on the shaft 32. The rack is raised into engagement with the worm by means of a plunger 74 actuated by a cam 75 on the main shaft of the machine. By this means the guides at the entrance and exit of the wire from the rolls are moved along the path of the helical grooves in the rolls. For returning the guides to initial or starting position, we provide the rocker arm 76 that engages the arm 71 and is oscillated by the cam piece 77 carried by the shaft 21.

It will be obvious that where, as in this case, a section of wire is flattened at some points, and remains round at other points the rate of travel at the delivery side of the rolls will be nonuniform; this for the reason that as the wire is flattened, it is elongated—in this instance approximately 10%. However, as the coiler will operate at a uniform speed, the flattener must be designed so that the delivery speed is somewhat greater than the take-up requirement of the coiler. This results in the formation of slack as indicated at 78 in Fig. 1. Another reason is that the flattening rolls should initially be formed with a somewhat greater diameter so that they may be ground from time to time to compensate for wear in the grooves, and the provision of a larger size enables the said rolls to be ground repeatedly without rendering them useless. While the indicated slack is unobjectionable, yet provision should be made for taking up some of it and this provision is utilized for another purpose.

In order to provide as short a section as possible of round wire between successive sections of flat wire, in different planes, it is desirable to interrupt the travel and retract the wire in order to give the twister sufficient time to rotate the wire to effect delivery in a different plane. Thus, the wire is retracted while the rotation of the wire is going on and in that manner the length of round wire between adjacent flats may be very short, as indicated at 79 in Fig. 8.

The mechanism for retracting the wire is best shown in Fig. 5, comprising a straightener 80 through which the wire is delivered, the straightener riding on a slide 81 having a notch 82 therein. A dog 83 is actuated by an arm 84, adapted to be oscillated by a cam 85 carried on the shaft 21. The pull of the wire advances the straightener against the tension of the spring 86 until the dog engages the notch 82. At a proper time the cam releases the dog and the straightener is retracted against the adjustable stop 87.

The operation is as follows:

The parts are shown in starting position in Fig. 3 wherein the rolls are separated and the wire is stationary, that part of the pass shown in Fig. 9 being active. As operation continues the rolls are lowered; the rack 72 is raised to start the feed of the guides and the successive portions of the passes shown in Figs. 10 to 14 are active. At the point indicated in Fig. 14 the wire is retracted by the action of the cam 85, the twister is rotated by the action of one of the cams 63—64 and the successive portions of the pass indicated in Figs. 13 to 16 are active. In the meantime, of course, the straightener has been pulled forward into locked position ready for another retracting operation. At the point shown in Fig. 16 the rolls are separated, the rack 72 is dropped, the guides are returned to initial position and the twister is reversed to restore the wire to its initial untwisted position, the parts being then ready for the beginning of another cycle. In the meantime the coiler has begun the production of a spring such as shown in Fig. 8.

The length of wire in a spring such as shown in Fig. 8 is approximately 97 inches; thus the coiler is still operating to form the spring while the flattener is operating on a unit of wire for the next successive spring and the machine must be coordinated to operate in proper relation. For commercial production of springs it has been found to be necessary to produce a spring such as shown in Fig. 8 every two seconds. This entails the speed of wire through the machine in excess of 50 inches per second and serves to explain the necessity for certain of the expedients heretofore explained.

We claim:

1. In a machine for forming springs composed, at least in part, of flattened wire, the combination, of a pair of rolls having registering helical grooves of varying cross-sectional contour, thereby forming an elongated pass of progressively varying shape, a guide for directing a wire into the so-formed pass, means for directing said guide laterally with the travel of the wire in said groove, means for separating said rolls and returning said wire laterally across the faces of the rolls to its starting point after the completion of a cycle.

2. In a machine for flattening wire for springs, the combination of a pair of rolls having registering helical grooves on the faces thereof, said grooves being of varying cross-sectional contour, thereby forming an elongated pass, and means for feeding a wire to the rolls at the start of the helical pass and returning the wire to the starting position after the completion of a cycle.

3. In a machine for flattening wire for springs, the combination of a pair of rolls having registering helical grooves on the faces thereof, said grooves being of varying cross-sectional contour, thereby forming an elongated pass, and means for feeding a wire to the rolls at the start of the helical pass, means for turning the wire on its longitudinal axis through 90 degrees at a point between the two extremities of said pass and means for returning the wire to the starting position after the completion of a cycle.

4. In a machine for forming springs, a portion of the wire in which is flattened to lie in two different planes, the combination of a pair of rolls having registering helical grooves of varying cross-sectional outline thereby forming an elongated pass, the pass at one point between two ends being enlarged, means for rotating said wire on its longitudinal axis while in the said enlarged portion of the pass, and means for guiding the wire and for returning it laterally across the face of the rolls after the completion of a cycle.

5. In a machine for forming springs, a portion of the wire in which is flattened to lie in two different planes, the combination of a pair of rolls having registering helical grooves of varying cross-sectional outline thereby forming an elongated pass, the pass at one point between two ends being enlarged, means for rotating said wire on its longitudinal axis while in the said enlarged portion of the pass, means for separating the rolls at the completion of a cycle and means for returning the wire between said separating rolls to its starting point.

6. In combination, rolls having registering helical grooves thereon, said grooves being of varying cross-sectional outline thereby forming a pass adapted to perform successively different operations on progressive portions on a length of wire, said pass having an area between its ends of enlarged cross-section whereby the wire is released without roll separation, means for rotating the wire through 90 degrees while in said enlarged portion of the pass, means for separating the rolls at the completion of a cycle, means for returning the wire to its starting point over the faces of the rolls.

7. In combination, rolls having registering helical grooves thereon, said grooves being of varying cross-sectional outline thereby forming a pass adapted to perform successively different operations on progressive portions on a length of wire, said pass having an area between its ends of enlarged cross-section whereby the wire is released without roll separation, means for rotating the wire through 90 degrees while in said enlarged portion of the pass, means for retracting the wire while it is released, means for separating the rolls at the completion of a cycle, means for returning the wire to its starting point over the faces of the rolls.

8. An automatic machine for flattening a wire in two planes in successive portions of its length, comprising in combination a pair of rolls having registering helical grooves, means for directing a wire into the initial portions of the pass formed by said grooves and for guiding the wire laterally across the face of the rolls in said grooves, means for rotating the wire through 90 degrees at a point between the ends of the length of wire being treated, means for separating the rolls, and means returning said guide and the wire held therein to the starting point on said rolls.

9. The combination with a coiler having feed rolls of a machine for flattening wire, said machine comprising rolls having registering helical grooves therein thereby forming an elongated pass of varying cross-sectional outline, said rolls acting to deliver flattened wire somewhat faster than it is taken up by the feed rolls of the coiler, the pass in said rolls having an enlarged portion at a point between its ends, and means operating when the wire is in said enlarged portion for retracting the wire and simultaneously rotating it through 90 degrees.

10. In a machine for flattening successive portions of a length of wire, the combination of a pair of rolls having registering grooves thereon, said grooves forming a pass of substantially the length of a unit of wire, to be operated on, said pass being successively of round, generally oval and flat cross-sectional outline whereby to produce a wire unit having successive sections that are round, tapered and flat.

11. In a machine for flattening successive portions of a length of wire, the combination of a pair of rolls having registering grooves thereon, said grooves forming a pass of substantially the length of a unit of wire to be operated on, said pass being successively of round, generally oval and flat cross-sectional outline whereby to produce a wire unit having successive sections that are round, tapered and flat, and means associated with said rolls for turning said wire through 90 degrees whereby to produce a succeeding section of flattened wire in a plane at right angles to the plane of the section in the first portion of the wire unit.

GEORGE G. POWERS.
CLARENCE H. FREDERICK.